(12) United States Patent
Ford (10) Patent No.: US 6,750,435 B2
(45) Date of Patent: Jun. 15, 2004

(54) LENS FOCUSING DEVICE, SYSTEM AND METHOD FOR USE WITH MULTIPLE LIGHT WAVELENGTHS

(75) Inventor: Gordon D. Ford, Round Rock, TX (US)

(73) Assignee: Eastman Kodak Company, Rochester, NY (US)

(*) Notice: Subject to any disclaimer, the term of this patent is extended or adjusted under 35 U.S.C. 154(b) by 89 days.

(21) Appl. No.: 09/960,629

(22) Filed: Sep. 21, 2001

(65) Prior Publication Data

US 2002/0159165 A1 Oct. 31, 2002

Related U.S. Application Data

(60) Provisional application No. 60/234,810, filed on Sep. 22, 2000, and provisional application No. 60/234,812, filed on Sep. 22, 2000.

(51) Int. Cl.[7] .................................................. G02B 7/04
(52) U.S. Cl. ............................... 250/201.2; 250/201.1; 359/210
(58) Field of Search ........................... 250/201.2, 201.1; 359/210

(56) References Cited

U.S. PATENT DOCUMENTS

| 4,260,899 A | 4/1981 | Baker ......................... 250/563 |
| 4,301,469 A | 11/1981 | Modeen et al. ................ 358/75 |
| 4,302,108 A | 11/1981 | Timson ........................ 356/359 |
| 4,462,860 A | 7/1984 | Szmanda ....................... 156/626 |
| 4,670,779 A | 6/1987 | Nagano ........................ 358/75 |
| 4,677,465 A | 6/1987 | Alkofer ........................ 358/80 |
| 4,680,638 A | 7/1987 | Childs ......................... 358/214 |
| 4,700,229 A | 10/1987 | Herrmann et al. ........... 358/166 |
| 4,775,238 A | 10/1988 | Weber ......................... 356/431 |
| 4,796,061 A | 1/1989 | Ikeda et al. .................... 355/73 |
| 4,845,551 A | 7/1989 | Matsumoto ................... 358/80 |
| 4,933,566 A | 6/1990 | Masaaki et al. ............. 250/563 |
| 4,937,720 A | 6/1990 | Kirchberg ..................... 363/41 |

(List continued on next page.)

FOREIGN PATENT DOCUMENTS

| DE | 28 21 868 A1 | 11/1979 | .......... G01N/21/32 |
| DE | 196 36 867 C1 | 1/1998 | ............ H04N/5/21 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

*Primary Examiner*—Hung X. Dang
(74) *Attorney, Agent, or Firm*—Simon, Galasso & Frantz (57) ABSTRACT

A lens focusing system provides a lens in an optical path between a scene and a photosensitive detector to properly focus a first set of wavelengths of light. At least one representation of the scene is captured. The focal point is adjusted for a second different set of wavelengths of light. This focal adjustment may be made by moving the lens and/or the detector, offsetting the position of the lens from the first position by a predetermined amount. An alternative method would impose at least a second lens in the optical path, thereby providing focus for a different wavelength. This alternative system may include various combinations of fixed and movable lenses. At least one representation of the image is captured using this different set of wavelengths of light. The different sets of wavelengths of light can include infrared light, visible light, and subsets and combinations thereof. In at least one embodiment, one of the recorded representations is an infrared defect map that can be combined with visible light representations to form an improved image.

35 Claims, 5 Drawing Sheets

U.S. PATENT DOCUMENTS

| | | | |
|---|---|---|---|
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,729,631 A | 3/1998 | Wober et al. | 382/232 |
| 5,762,773 A | 6/1998 | Rasmussen | 204/485 |
| 5,770,847 A * | 6/1998 | Olmstead | 235/462.35 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |

FOREIGN PATENT DOCUMENTS

| | | | | |
|---|---|---|---|---|
| EP | 1 547 811 | | 6/1979 | H04N/3/36 |
| EP | 0 422 220 A1 | | 4/1991 | A61B/6/03 |
| EP | 0 482 790 B1 | | 4/1992 | H04N/1/40 |
| EP | 0 527 097 A2 | | 2/1993 | H04N/1/40 |
| EP | 0 569 142 A1 | | 11/1993 | H04N/5/253 |
| EP | 0 624 848 A2 | | 11/1994 | G06F/15/68 |
| EP | 0 669 753 A2 | | 8/1995 | H04N/1/407 |
| EP | 0 716 538 A2 | | 6/1996 | H04N/1/50 |
| EP | 0 751 670 A2 | | 1/1997 | H04N/1/10 |
| EP | 0 768 621 A2 | | 4/1997 | G06T/5/20 |
| EP | 0 794 454 A2 | | 9/1997 | G03B/27/73 |
| EP | 0 816 833 A2 | | 1/1998 | G01N/21/88 |
| EP | 0 816 833 A3 | | 8/1998 | G01N/21/88 |
| EP | 0 893 914 A2 | | 1/1999 | H04N/5/253 |
| GB | 2 283 633 A | | 5/1995 | H04N/5/262 |
| JP | 4-291139 | | 10/1992 | G01N/21/89 |
| JP | 11185028 | | 7/1999 | G06T/1/00 |
| JP | 2000-13604 | | 1/2000 | H04N/1/409 |
| JP | 2000-196813 A | | 7/2000 | |
| WO | WO 84/02019 | | 5/1984 | G06F/15/20 |
| WO | WO 89/06890 | | 7/1989 | H04N/3/36 |
| WO | WO 90/01240 | | 2/1990 | H04N/1/40 |
| WO | WO 91/09493 | | 6/1991 | H04N/5/127 |
| WO | WO 92/05469 | | 4/1992 | G03B/27/53 |
| WO | WO 95/15530 | | 6/1995 | G06F/17/14 |
| WO | WO 97/16028 | | 5/1997 | H04N/7/30 |
| WO | WO 98/31142 | | 7/1998 | H04N/5/253 |
| WO | WO 98/34397 | | 8/1998 | |
| WO | WO 99/40729 | | 8/1999 | H04N/9/11 |
| WO | WO 01/48694 | | 7/2001 | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97—601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, Digital Color Management, Giorgianni, et al., Jan. 1998, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc., http://www.asf.com/html/o_products/iceprod.html. Aug. 5, 1999.

*About Digital ICE Technology*, Applied Science Fiction, Inc., http://www.asf.com/html/o_products/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

LENS FOCUSING DEVICE, SYSTEM AND METHOD FOR USE WITH MULTIPLE LIGHT WAVELENGTHS

CROSS REFERENCE TO RELATED APPLICATIONS

This application claims benefit under 35 U.S.C. § 119 of the following U.S. provisional patent applications: Serial No. 60/234,810, entitled Lens Focusing Device, System and Method for Use, which was filed on Sep. 22, 2000; and Serial No. 60/234,812, entitled Lens Focusing System and Method for Use, which was filed on Sept. 22, 2000.

FIELD OF THE INVENTION

The present invention relates generally to image capturing systems, and more particularly to lens focusing devices, systems and methods used in image capturing systems.

BACKGROUND OF THE INVENTION

Lenses are used in almost every image capturing system, whether that system is a film camera, a digital camera, a scanner, a copier, a facsimile machine or other system. Lenses gather light, and focus the light onto a recording medium or light sensitive component, sometimes called a detector, that generates electrical signals in response to the light. It is intuitive that correctly focusing light is critical to accurately capturing a desired image. If light is not properly focused, a blurry image will be recorded.

Three methods are commonly used to properly focus light: fixed focusing, manual focusing and automatic focusing. Fixed focusing is often used in low-end cameras, as well as in most copiers, scanners, facsimile machines, etc., due to the low cost and ease of use. Manual focusing is used in a variety of midrange to higher-end systems, and automatic focusing is predominantly used in high-end cameras and other image capturing devices that require fine image detail.

All of these focusing methods attempt to position a lens an appropriate distance from the detector, so that the light transmitted through the lens is focused on the detector. This distance is sometimes referred to as the focal length of the lens. The focal length of a lens is dependent upon the wavelength (and therefore the frequency) of light passing through the lens. For example, a single lens will focus red light and blue light at slightly different distances from the lens. In particular, red light actually refers to a portion of the electromagnetic spectrum made up of many wavelengths, and a single lens will focus each of these different wavelengths of red light at slightly different distances. Accordingly, each wavelength within the electromagnetic spectrum is focused at a different distance.

As a result, when a lens focuses light onto a detector, whether using a fixed focus system, a manually focused system, or an automatic focusing system, the lenses focal length is configured to focus a wavelength that provides a compromise focus for a set of wavelengths. In general, the compromise wavelength to which the lens is focused is chosen so that no portion of the visible portion of the electromagnetic spectrum is too far out of focus.

While this procedure has been adequate when used with a single set of wavelengths generally within the visible portion of the electromagnetic spectrum, some image capturing systems, such as film scanners, are beginning to use that portion of the electromagnetic spectrum outside of the visible portion of the electromagnetic spectrum. As a result, focusing a lens for a compromise wavelength is less effective, because of the greater difference in wavelengths between the visible and other parts of the electromagnetic spectrum. A single lens in a single position can not adequately focus this entire range of wavelengths.

SUMMARY OF THE INVENTION

Therefore, what is needed is a way to allow image capturing systems the ability to focus multiple portions of the electromagnetic spectrum with a single detector. Accordingly, the present invention comprises a device, system and method capable of focusing a first set of wavelengths of light onto a detector, and then focusing a second, different set of wavelengths of light onto the same detector. In at least one embodiment, the first set of wavelengths of light comprises predominantly visible light, and the second set of wavelengths comprises predominantly infrared light.

One embodiment of the present invention provides a lens focusing system comprising at least one lens capable of focusing at least two different sets of wavelengths of light from a scene onto a detector by altering the distance from said at least one lens to said detector. In at least one embodiment, at least one of the at least two different sets of wavelengths of light comprises predominantly visible light, and another of the two sets of wavelengths comprises predominantly infrared light.

In at least one embodiment, a first distance of the lens from the detector is determined using an automatic focusing system capable of focusing a set of wavelengths comprising primarily visible light, and a second distance of the lens from the detector is a predetermined offset from the first distance.

An alternate embodiment of the present invention provides a lens focusing system comprising a plurality of lenses capable of being interposed in an optical path between a scene and a detector. The plurality of lenses is capable of focusing at least two different sets of wavelengths of light from the scene onto the detector by moving at least one of the plurality of lenses into and out of the optical path. In at least one embodiment, the first frequency corresponds to visible light, and the second frequency corresponds to infrared.

In addition to these embodiments, the lens focusing system may be included as part of an image capturing system. The image capturing system also comprises a detector capable of generating electrical signals in response to light, at least one illumination source capable of providing illumination in the infrared portion of the electromagnetic radiation spectrum, as well as at least one illumination source capable of providing illumination in the visible portion of the electromagnetic radiation spectrum.

An advantage of at least one embodiment of the present invention is that an automatic focusing system can be easily adapted for infrared focusing simply by using a predetermined offset to a focusing element's position.

An advantage of at least one embodiment of the present invention is that a sharper images can be recorded, because the lens is in focus for both visible and infrared scans.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF A PREFERRED EMBODIMENT OF THE INVENTION

FIGS. 1–5 illustrate a lens focusing system and method for use in accordance with the present invention. In particular the present invention is illustrated in terms of an image capturing system, such as a scanner. As described in greater detail below, the image capturing system may include an automatic focusing system capable of altering the distance between a lens and a detector to focus at least two different sets of wavelengths onto a detector. Alternately, the system may include an additional lens that can be used instead of or in conjunction with the standard lens to provide the correct focus for the second wavelength. Preferably one of the sets of wavelengths comprises primarily visible light, and another set of wavelengths comprises primarily non-visible light.

The term "light", as used herein, refers to electromagnetic energy, and preferably electromagnetic energy with frequencies generally in the range of $10^{12}$ Hz to $10^{16}$ Hz. This range encompasses visible light, as well as infrared (IR) and ultraviolet portions of the electromagnetic radiation spectrum, with visible light corresponding primarily to frequencies in the range of $4\times10^{14}$ Hz through $7\times10^{14}$ Hz.

Figure 1:
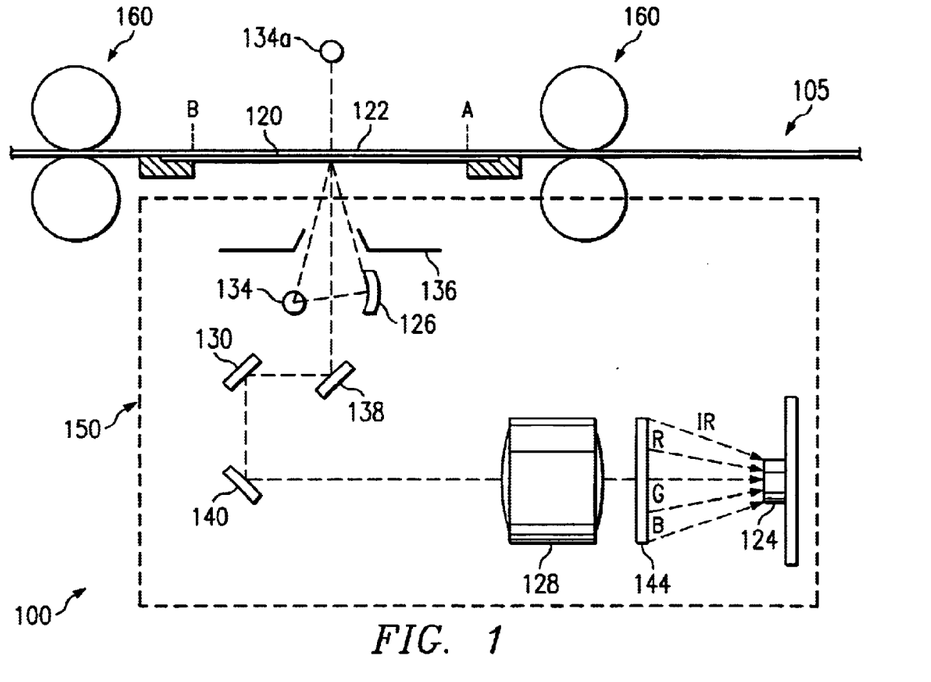
FIG. 1 is a block diagram of an image capturing system according to one embodiment of the present invention.

Referring to FIG. 1, image capturing system 100 is illustrated according to one embodiment of the present invention. Image capturing system 100 is illustrated as a scanner, however, it will be appreciated that image capturing system 100 is not limited to scanners, but also includes facsimile machines, copiers, optical character recognition systems, various special purpose imaging devices, and the like. Image capturing system 100 may include a transparent platen 120 over which a film having a developed image 122 to be captured is located. Although transparent platen 120 is illustrated, use of transparent platen 120 is not required in implementing the present invention. For example, pressure rollers 160 can be configured to hold film 105 taught. Alternatively, an opaque film support having a slot cut therethrough can be employed.

In one implementation, one or more photosensitive scanning arrays 124 are supported for reciprocating scanning movement below platen 120. In yet another implementation, additional photosensitive arrays (not shown for ease of illustration) may be positioned above and below platen 120, and may or may not be configured to move along with platen 120. It will be appreciated that movement of scanning array 124 is described relative to a physical medium to be scanned. Relative movement can be provided by moving platen 120, by moving film 105, or by moving scanning system assembly 150. A scanning system assembly 150 includes several optical components which may move together as a single unit. In one embodiment, the scanning system assembly 150 includes a lamp 134, an associated reflector 126 and a baffle 136, with the latter two elements cooperating to direct a narrow band of light onto a small area across the platen 120. Lamp 134 may be a single unit, such as a light bulb, that provides visible light and/or IR light. Alternatively, lamp 134 may comprise separate TR and visible light generating components, such as separate gas filled chambers within a bulb, or multiple bulbs in a single physical package. Also included in the assembly 150 are lens 128, and mirrors 130, 138 and 140, which operate together to focus the light band onto the platen 120 and film 105 being scanned thereon, through color sensor 144, where light from the light band is filtered into separate color sources (e.g. IR, red, green and blue), and onto the scanning array 124. Scanning array 124 produces electrical image signals representative of image 122. These signals may be output for image processing by an external image processing system such as a workstation, personal computer, or the like. Alternatively, image capturing system 100 may include an internal processor (not illustrated) for performing image processing functions.

Illumination source 134a is, in one embodiment, also included with scanning assembly 150. Illumination source 134a may provide illumination in the visible and/or infrared portions of the electromagnetic spectrum. Illumination source 134a is used in a similar manner to lamp 134, except that illumination source 134a is positioned to illuminate the back of film 105 containing image 122. By illuminating the back of film 105, illumination source 134a provides a source of transmitted light that can be used in accordance with the principles of the present invention to record a "through" view of image 122. As previously mentioned, additional photosensitive arrays (not shown) may be positioned above platen 120 to receive light transmitted through film 105 containing image 122. Various arrangements of illumination sources and detectors that permit measurements to be made using reflected light, transmitted light, or both, can be implemented according to the present invention. Upon consideration of the remainder of this discussion, it will become apparent that the present invention can be implemented using a single illumination source, or multiple illumination sources. In addition, scanning system 100 can employ various illumination sources capable of providing different frequencies of light, along with corresponding detectors. Note that the detectors may comprise a single sensor, or multiple sensors in various suitable arrangements.

Scanning array 124 may be a linear array of photosensitive sensors such as charge coupled devices, photo-diodes, complementary metal-oxide semiconductor (CMOS) devices, or any suitable photo-detector that operates to sense light reflected from or transmitted through film 105 containing image 122 during the illumination period. The photosensitive detectors produce electrical signals indicative of the intensity of light sensed. These electrical signals are used to generate an electronic representation of image 122, or measurement of an attribute of image 122 such as image density. In one embodiment, a single detector and/or detector array is used to generate electrical representations of image 122 from scans performed using IR and visible portions of the electromagnetic radiation spectrum. In other embodiments, one detector and/or detector array is used to record electrical representations of images from scans using the IR portion of the electromagnetic radiation spectrum, and a different detector and/or detector array is used in conjunction with scans using the visible portion of the electromagnetic radiation spectrum.

Scanning array 124 generally extends in a direction transverse to that of the motion of scanning system assembly 150. This enables scanning system assembly 150 to move along an axis known to those skilled in the art as the "slow scan" axis, which begins at one end of image 122 and extends in the process direction towards the opposite end. The direction across the page in which the array extends is known as the fast scan axis.

As discussed earlier, movement of scanning system assembly 150 is described relative to film 105 being scanned, and film 105 may be moved rather than the scanning assembly. In one embodiment of the present invention, scanning system assembly 150 remains fixed in place, and pressure rollers 160 cooperate to move a portion of film 105 into a recording position. In a recording position, an image present on film 105 is preferably located between illumination source 134a and baffle 136, so that light is transmitted through film 105, and detected by scanning array 124.

Figure 2:
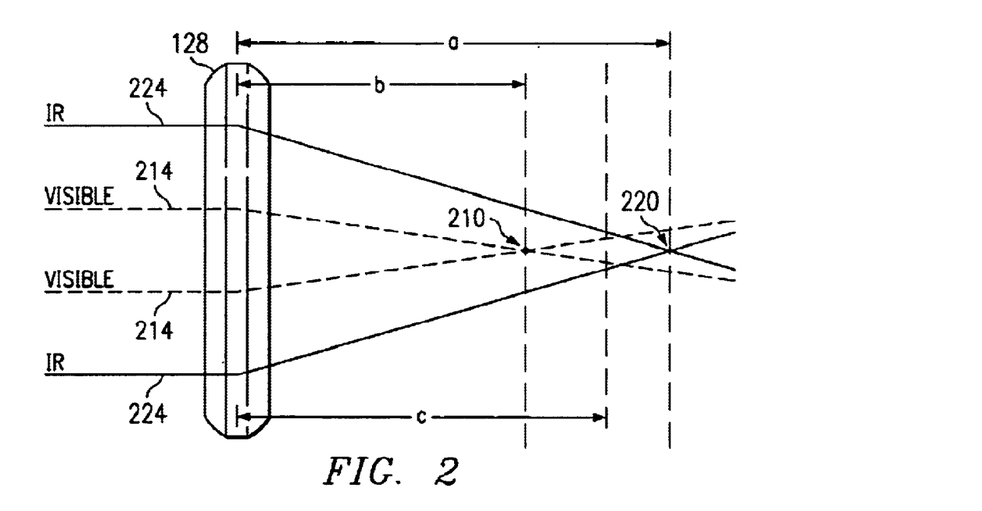
FIG. 2 is a schematic representation of a lens focusing two different wavelengths of electromagnetic energy according to at least one embodiment of the present invention.

Referring to FIG. 2, focusing different sets of wavelengths of light by altering the position of a lens system will be discussed, according to an embodiment of the present invention. A lens system may comprise a single lens or multiple lenses, one or more of which are preferably movable. In at least one embodiment of the present invention, lens 128 is used to focus an image onto detectors in scanning array 124. A particular lens bends, or diffracts, different frequencies of electromagnetic radiation differently. As a result, images having different wavelengths of light will be focused at different distances from the lens. Consider for example, IR light 224 and visible light 214 passing through lens 128. As illustrated, lens 128 diffracts visible light 214 (having relatively short wavelengths) more than lens 128 diffracts JR light 224 (having relatively long wavelengths). As a result, an image consisting of JR light 224 is focused by lens 128 at a distance a from lens 128. Distance a can be understood as the distance between lens 128 and the point 220 where the two rays of JR light 224 converge. When using lens 128 to focus electromagnetic radiation onto a detector such as scanning array 124 (FIG. 1), an IR image projected through lens 128 is said to be in focus when the detector is positioned at a distance a from lens 128. Similarly, the two rays of visible light 214 converge at point 210, which is a distance b from lens 128. Therefore the distance from lens 128 to the detector needed to focus lens 128 for visible light 214 is b.

At distance a, IR light 224 is in focus, while visible light 214 is out of focus. At distance b, visible light 214 is in focus and JR light 224 is out of focus. When lens 128 is positioned an intermediate distance c from a detector, neither TR light 224 or visible light 214 is in focus. Because of this, a scanner according to at least one embodiment of the present invention first moves a lens assembly including lens 128, such that lens 128 is a distance b from a detector and performs a scan using visible light 214, and then moves the lens assembly so that lens 128 is moved by a predetermined offset from distance b to distance a, and performs an JR light scan. Other embodiments switch the order of the scans, first performing the scan using JR light 224, and then performing the scan using visible light 214. In each case, lens 128 is positioned for appropriate focusing. Still other embodiments of the present invention position lens 128 for focusing different parts of the electromagnetic radiation spectrum, and perform corresponding scans. For example, separate scans can be performed to record blue light images and green light images. In order to perform these scans, lens 128 is positioned the distance from the detector needed to focus the lens for the appropriate wavelength of light.

Figure 2A:
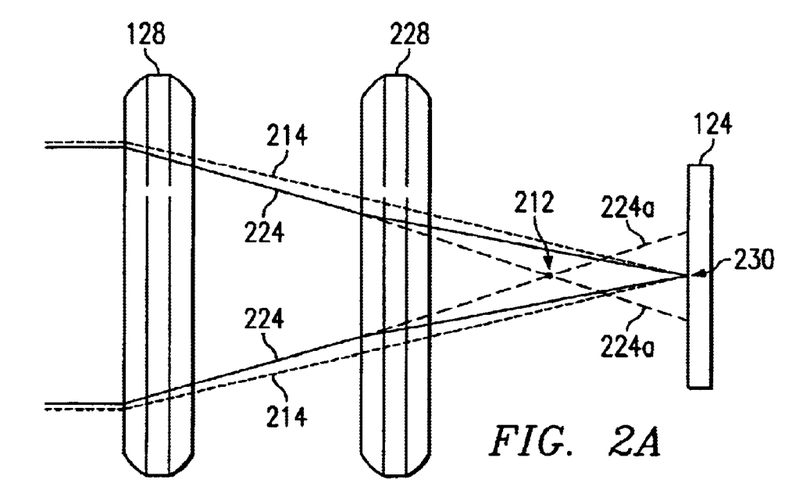
FIG. 2A is a schematic representation of altering a system's focus by using an additional lens according to an embodiment of the present invention.

FIG. 2A presents an alternative method of focusing light by interposing a lense system in an optical path will be discussed according to at least one embodiment of the present invention. A lens system may comprise a single lens, or multiple lenses, each of which may be stationary or movable. A lens system as described herein may include any suitable combination of stationary and movable lenses that can be used to focus light from a scene onto a detector. In at least one embodiment, lens 128 is used to focus a visible light image onto detectors in scanning array 124. As stated above, a particular lens generally bends, or diffracts, different frequencies of electromagnetic radiation differently. As a result, an image composed primarily of one set of frequencies of light may be in focus, while an image composed primarily of a different set of frequencies of light is out of focus. Consider for example, IR light 224 passing through lens 128. If second lens 228 were not present, IR light 224 would follow unfocused path 224a, and the two rays of IR following unfocused path 224a would converge at out-of-focus point 212, causing the image at scanning array 124 to be out of focus. In order to focus IR light 224 so that the two rays of IR light 224 converge at in-focus point 230, another lens, such as second lens 228, can be interposed in the optical path of the IR light to "correct" the focus of lens 128.

The dotted line represents visible light 214. Unlike IR light 224 in this example, when second lens 228 is not interposed in the optical path of an image composed of visible light, lens 128 correctly focuses visible light 214 at in-focus point 230, enabling scanning array 124 to capture a sharp image. In use, at least one embodiment of the present invention employs a lens system configured to maintain lens 128 in a fixed position interposed in the optical path, and keep second lens 228 positioned outside the optical path, in order to focus visible light images. The lens system then interposes a second combination of lenses, comprising both lens 128 and second lens 228, into the optical path in order to focus IR light. In other embodiments, the lens system focuses IR light using a single lens fixed into the optical path, and visible light is focused using a combination of lens 128 and second lens 228. A lens system according to at least one embodiment of the present invention may use other suitable lens combinations as desired.

Although FIG. 2A illustrates a lens system configured to interpose second lens 228 to focus IR light, other lens systems according to the present invention interpose lens 128 for focusing different parts of the electromagnetic radiation spectrum. For example, images can be captured representing information from the blue and green portions of the electromagnetic radiation spectrum by configuring lens 128 to focus blue light, and configuring second lens 228 to work in conjunction with lens 128 to focus green light. A lens system according to one embodiment of the present invention may focus additional and/or different wavelengths by interposing additional lenses, or configuring lens 128 and second lens 228, as needed to focus the appropriate wavelength of electromagnetic radiation.

One use of a lens focusing system according to at least one embodiment of the present invention, is to perform two scans of a film using two different portions of the electromagnetic spectrum. One of the scans is preferably performed using visible light to record an image for reproduction. The other of the scans is preferably performed using IR light to record an electronic representation of the image to be used as a defect map. The two images can then be combined to form an improved image having fewer defects than an image recorded using visible light only.

Figure 3:
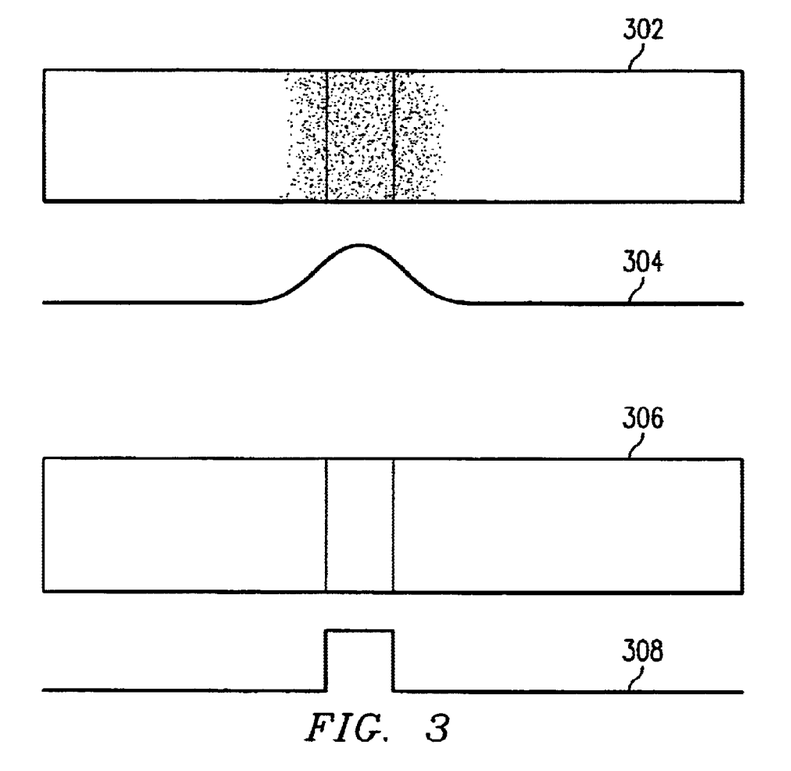
FIG. 3 is a simplified diagram illustrating how focusing affects the frequency content of an image received by a detector according to at least one embodiment of the present invention.

Referring now to FIGS. 1 and 3, a method of focusing lens 128 for visible light is discussed according to one embodiment of the present invention. Out-of-focus stripe 302 and in-focus-stripe 306 are both sections of image data as observed by scanning array 124. Both stripes 302 and 306 show a series of image pixels that are converted to electrical signals by scanning array 124. These electrical signals can be analyzed for frequency content. For example, the pixels of out-of-focus stripe 302 are not sharply delineated, and the values generated by scanning array 124 in response to out-of-focus stripe 302 can be idealized as sine wave 304. In a "perfectly" out of focus image, sine wave 304 may consist of only a single frequency component. However, in most cases sine wave 304 is not an idealized sine wave, and includes multiple frequency components, each of which may be determined by performing a Fourier transform on the data representing out-of-focus stripe 302. In-focus-stripe 306, on the other hand, demonstrates sharp definition between adjacent pixels. The electrical signals generated by scanning array 124 can therefore be idealized as square wave 308. As is known to those skilled in the art, a perfect square wave has an infinite number of frequency components. These frequency components, as with the frequency components of a sine wave, may be determined by performing a Fourier transform of the data representing in-focus-stripe 306. In practice, the electrical signals generated by scanning array 124 are neither a perfect sine wave for out-of-focus stripe 302, nor a perfect square wave for in-focus stripe 306, because an image is rarely perfectly out of focus or perfectly in focus. However, the more closely an image approaches an in-focus condition, the more frequencies, or harmonic content the image data will have when processed through a Fourier transform type process. It will be appreciated that mathematical transforms and algorithms other than Fourier transforms may be performed to determine whether lens 128 is properly focused.

In at least one embodiment of the present invention, an automatic focusing system employing a frequency analysis scheme as described above, is used to properly focus lens 128 for recording at least one visible light image. After the visible light image is recorded, lens 128 is then focused for recording an IR image by moving lens 128 a predetermined offset distance from the visible light focused position, as discussed in more detail below. It will be appreciated that automatic focusing systems employing different methods may be used to focus lens 128 for use with visible light, consistent with the objects of the present invention. It will also be appreciated that various suitable mechanical systems may be employed to move lens 128 into a properly focused position for either visible light or IR.

Figure 4:
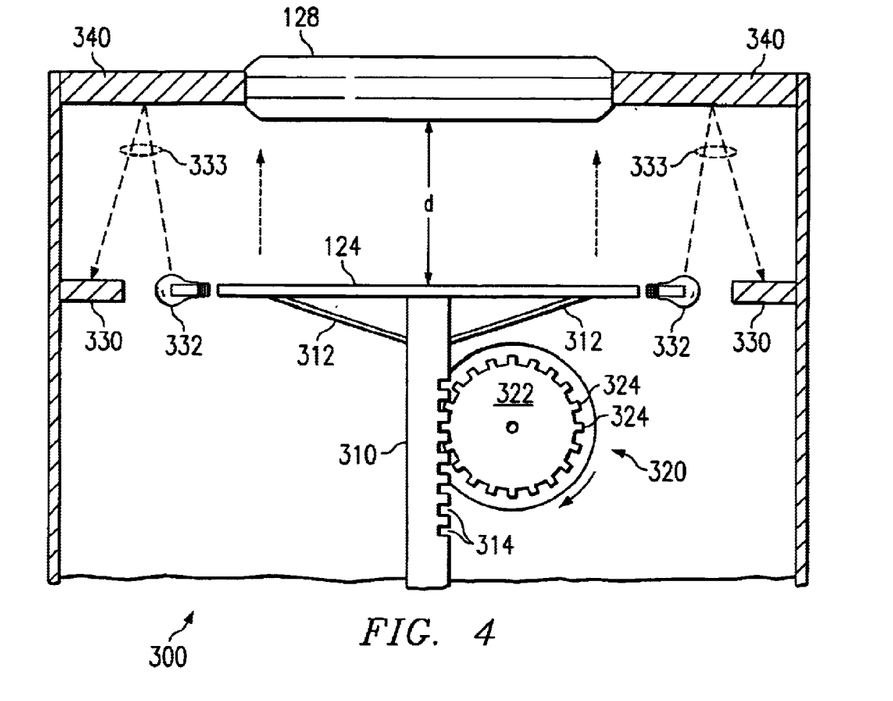
FIG. 4 is a perspective view of an automatic lens focusing system according to one embodiment of the present invention.

Referring to FIG. 4, one such alternate automatic lens focusing system is illustrated according to one embodiment of the present invention, and designated generally as focusing system 300. In at least one embodiment focusing system 300 includes lens 128, which is supported by supports 340 in a fixed position relative to focusing system 300, and scanning array 124 supported by arms 312 and post 310.

Post 310 comprises gear receiving notches 314 configured to receive gear teeth 324, and to move up or down in response to the rotation of gear 322 coupled to motor 320, thereby increasing or decreasing distance d between lens 128 and scanning array 124. Motor 320 is preferably a stepper motor capable of moving in discreet increments in response to control signals provided by a micro-processor (not illustrated) or other control capable device.

It should be noted that in a preferred embodiment, the automatic focusing features of focusing system 300 are employed to move lens 128 into focus for visible light, and then lens 128 is moved into focus for IR light by simply applying a predetermined offset to the visible light position. The predetermined offsets used to focus lens 128 for IR light may be calculated, or determined empirically. A constant, fixed offset may be applied to lens 128 in all circumstances, or a variable offset may be used in different circumstances. For example, different offsets may be employed for different levels of magnification. If variable offsets are employed, the offsets may be retrieved from a look-up table. Alternatively, a number of stepper motor steps corresponding to particular offsets may be stored in the look-up table. In at least one embodiment of the present invention, elements of an offset look-up table are referenced to other information, which may itself be contained in look-up tables. The other information may include, but is not limited to, manufacturer specifications, empirical test results, user preferences, various conditional adjustments, and the like.

The illustrated embodiment of focusing system 300 further comprises focusing transmitters 332 and focusing receivers 330. Focusing transmitters 332 transmit signals 333, which may include sound waves, light, or other suitable signals, which reflect from supports 340 and return to focusing receivers 330. Focusing receivers 330 measure signals 333, and determine distance d based on transit time, phase shift, or another measurable characteristic of signals 333. Alternatively, focusing receivers 330 may transmit measurements for use by a processing system (not illustrated) in determining distance d. The distance d is then adjusted by controlling motor 320 to raise or lower scanning array 124 to focus lens 128 for a particular wavelength of electromagnetic radiation to be used in scanning an image.

Other embodiments of the present invention use other auto focusing techniques to focus lens 128 for use with visible light. For example, various distance detecting mechanisms not requiring a signal to be transmitted, such as capacitance measuring systems, can be employed without departing from the spirit and scope of the present invention. Other active and passive automatic focusing techniques can also be employed according to the objectives of the present invention.

FIG. 4 illustrates a particular embodiment in which a scanning array 124 is moved and lens 128 remains in a fixed position. In other embodiments, lens 128 is moved, while scanning array 124 remains in a fixed position. Yet other embodiments move both lens 128 and scanning array 124 to position lens 128 the needed distance from scanning array 124. It will be appreciated that when reference is made to focusing, positioning, moving, or otherwise altering the physical orientation of a lens 128, re-orienting scanning array 124 may achieve comparable results.

Figure 4A:
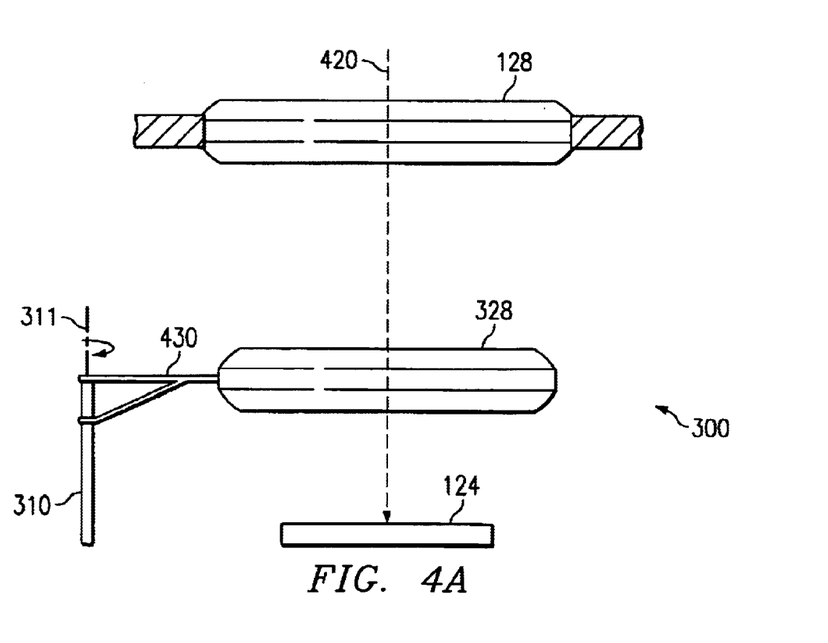
FIG. 4A is a perspective view of a lens focusing system according to one embodiment of the present invention.

Referring to FIG. 4A a lens focusing system 300 is illustrated according to an alternate embodiment of the present invention. Lens focusing system 300, as illustrated, comprises lense 128 and movable lens 328 which focus light, either in cooperation with each other or independently, onto a detector such as scanning array 124. Optical path 420 represents a path followed by light traveling from a scene to scanning array 124. In at least one embodiment, a scene includes images formed in physical media such as cellulose film, photographic paper, stained glass, or any other suitable medium. When a physical medium is illuminated, light reflected from and/or transmitted through the physical medium may be guided through lens 128, which is interposed in optical path 420, and focused onto scanning array 124.

Lens 128 is, in one embodiment, held in a stationary position such that lens 128 continuously remains interposed in optical path 420. Movable lens 328 is coupled to pivot arm 430. Pivot arm 430 is, in turn, rotatably coupled to post 310 such that when pivot arm 430 is rotated about axis 311, movable lens 328 is interposed into optical path 420. When it is no longer desired to have movable lens 328 interposed in optical path 420, pivot arm 430 is again rotated, and movable lens 328 is removed from optical path 420. In at least one embodiment, pivot arm 430 can be rotated in either a clockwise or counter clockwise manner to interpose lens 328 into optical path 420 and/or remove movable lens 328 from optical path 420. Rotation of pivot arm 430 can be accomplished by a motor and/or other suitable driving mechanisms know to those skilled in the art.

In the illustrated embodiment of lens focusing system 300, movable lens 328 is positioned between lens 128 and scanning array 124. In other embodiments, however, lens 128 is between movable lens 328 and scanning array 124. Additionally, although only a single movable lens 328 is illustrated, lens focusing system 300 may include multiple lenses that can be interposed at various positions to provide appropriate focusing for a desired set of wavelengths of light.

Figure 4B:
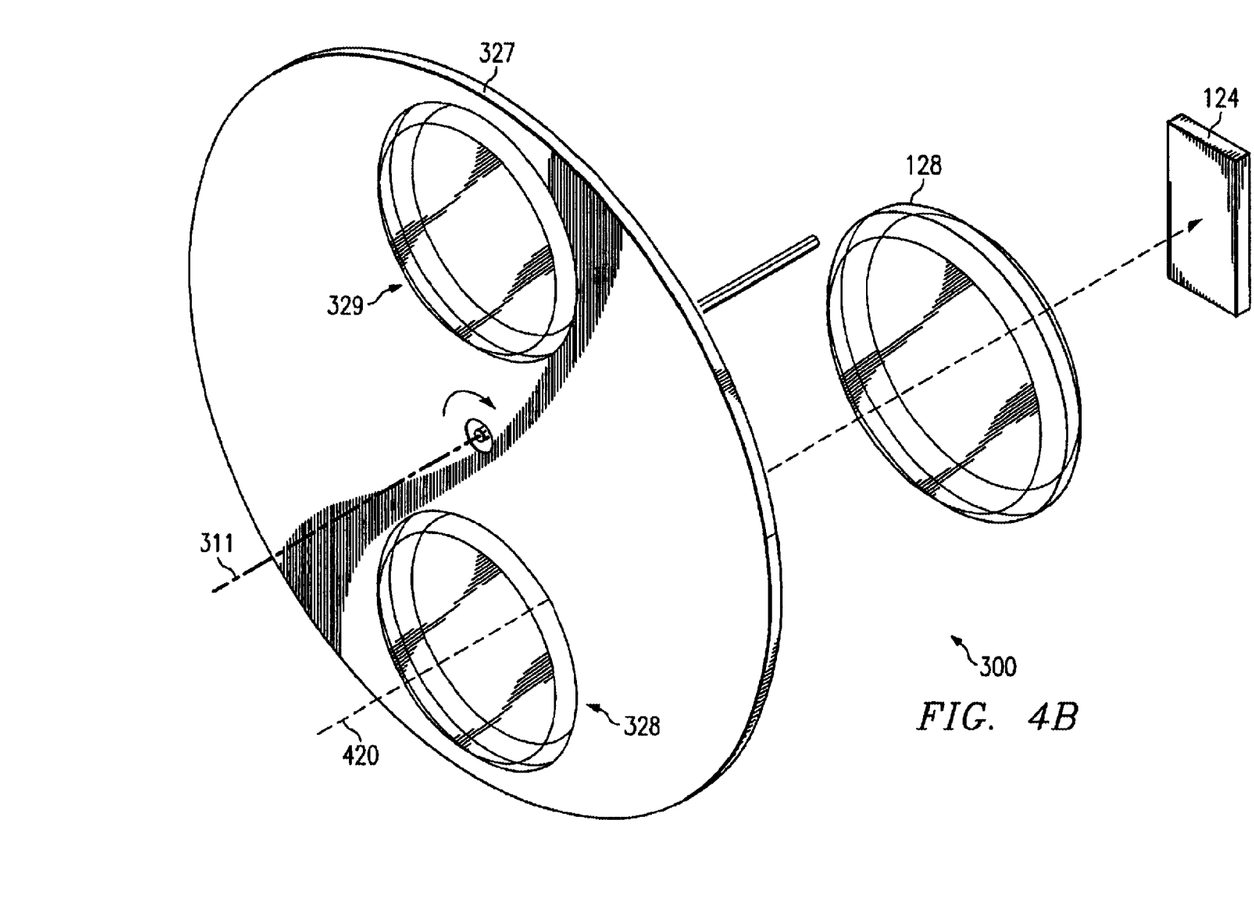
FIG. 4B is a perspective view of another embodiment of a lens focusing system according to an embodiment of the present invention.

FIG. 4B expands on this alternate lens focusing system according to another embodiment of the present invention. Here lens focusing system 300 comprises lens 128 and lens assembly 327, which focus light onto scanning array 124. Lens assembly 327 comprises movable lens 328 and second lens 329. In the illustrated embodiment, movable lens 328 and second lens 329 are positioned in lens assembly 327 such that as lens assembly 327 is rotated about axis 311, either movable lens 328 or second lens 329 is interposed into optical path 420.

In one embodiment, movable lens 328 is configured to focus IR light in conjunction with lens 128, while second lens 329 is a clear lens that does not significantly affect the focus of electromagnetic radiation traveling along optical path 420. However, in other embodiments, second lens 329 may cooperate with lens 128 to focus a different wavelength of electromagnetic radiation than that focused by the combination of movable lens 328 and lens 128, or lens 128 alone. In other embodiments, lens 128 is not maintained in a stationary position along optical path 320; instead second lens 329 performs most of the functions of lens 128. For example, movable lens 328 may focus IR light and second lens 329 may focus visible light. In such a case, suitable focusing may be accomplished by rotating lens assembly 327 to interpose the appropriate lens 328 or 329. In other embodiments lens assembly 327 includes additional lenses configured to focus, either independently or in conjunction with lens 128, a desired wavelength of light.

Figure 5:
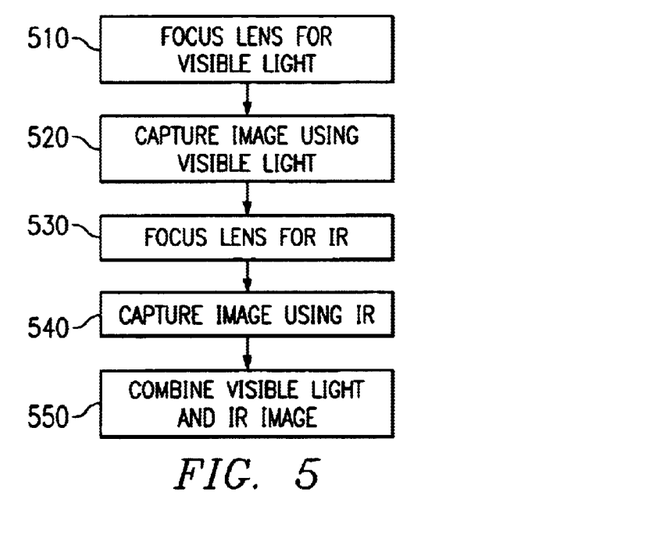
FIG. 5 is a flow diagram illustrating a method according to one embodiment of the present invention.

Referring to FIG. 5, a method of capturing images according to at least one embodiment of the present invention will be discussed. The method is preferably implemented using a film scanner having an automatic focusing system, although other image capturing systems having various focusing mechanisms may be employed without departing from the spirit and scope of the present invention.

The method begins with step 510, in which a lens is focused in preparation for capturing an image using visible light. This is preferably accomplished using a standard automatic focusing mechanism known to those skilled in the art. During step 510, the lens is positioned such that a visible light image seen by the lens is clearly projected upon an array of photosensitive detectors. Since the human eye is generally more sensitive to the blue portion of the electromagnetic radiation spectrum than it is to the red portion of the spectrum, it is preferred that the lens be positioned to ensure the clarity (focus) of the blue portion of an image, even at the expense of a small amount of blurriness in the red portion of the image.

Once the lens has been positioned in step 510, the method proceeds to step 520 to capture one or more electronic representations of an image formed on a physical medium. Preferably, at least three electronic representations are recorded, each representation containing primarily information corresponding to either the red, green, or blue portion of the electromagnetic radiation spectrum. The physical medium may be a negative or positive color film record, a black and white film record, a photograph formed on photographic paper, a printed document, or the like. In step 520, the physical medium is scanned by illuminating the medium with visible light. Either reflected light, transmitted light, or a combination of reflected and transmitted light strike a photosensitive detector after interacting with an image formed on the physical medium, and the photosensitive detector generates electrical signals in response to the light. These electronic signals can then transmitted from the detector to a processor for image processing. Alternatively, the detector may include the necessary processing capabilities to perform image processing functions, in which case the electrical signals need not be transmitted for processing. Image processing includes alterations to the recorded electronic representation of the image, including format changes, filtering, defect removal, transformation, color correction, image combination, filter application, and the like.

After the image is captured using visible light in step 520, the method proceeds to step 530. In step 530 the lens is focused in preparation for an IR image capturing process, which uses electromagnetic radiation from the infrared portion of the spectrum to record a representation of the same image for which was captured in step 520. In at least one embodiment, the lens is focused by moving the lens a predetermined offset from the visible light focused position. As mentioned earlier, focus may be adjusted using a stepper motor to move the lens or the detector by a predetermined offset. Alternatively, the amount of offset may be monitored and controlled by various sensing devices known to those skilled in the art. Once the lens is properly positioned in step 530, step 540 is performed. In step 440, the image is scanned using the IR portion of the electromagnetic radiation spectrum, and one or more IR representation of the image are recorded.

The method proceeds next to step 550. In step 550, the visible light and IR images are combined. Preferably, the IR image is a defect map, and the visible light image is a desired image to be later reproduced. The defect map and the desired image can be electronically combined to produce an improved image having fewer and/or less noticeable defects. The images may be combined using various thresholding, summation, and difference techniques known to those skilled in the art.

Figure 5A:
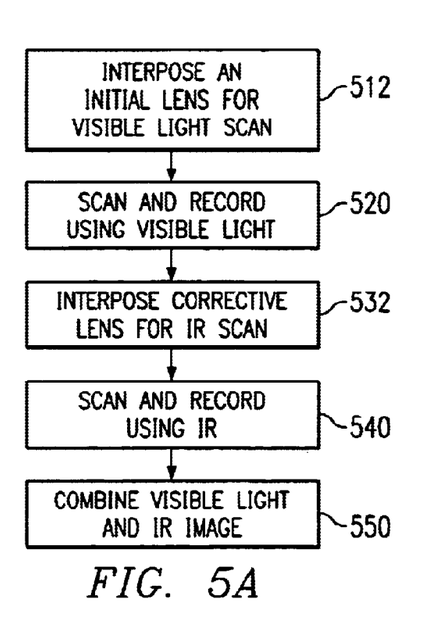
FIG. 5A is a flow diagram illustrating a method according to one embodiment of the present invention.

FIG. 5A, provides an alternative method of capturing images according to at least one embodiment of the present invention will be discussed. The method varies from the one previously discussed in that it employs a fixed lens in combination with a movable lens, although other image capturing systems having suitable focusing mechanisms may be employed without departing from the spirit and scope of the present invention.

The method begins with step 512, in which a lens is interposed in an optical path between a physical medium having an image formed therein, and at least one photosensitive detector. The lens is interposed in the optical path in preparation for capturing an image using visible light. Preferably, the lens to be interposed for visible light focusing is maintained in a fixed position such that the lens is always in the optical path. During step 512, the lens is interposed such that a visible light image seen by the lens is clearly projected upon an array of photosensitive detectors. Since the human eye is generally more sensitive to the blue portion of the electromagnetic radiation spectrum than it is to the red portion of the spectrum, it is preferred that the lens be configured to ensure the clarity (focus) of the blue portion of an image, even at the expense of a small amount of blurriness in the red portion of the image.

The method then proceeds to step 520. In step 520 one or more electronic representations of a scene are captured using visible light. Preferably, at least three electronic representations are recorded, each representation containing primarily information corresponding to either the red, green, or blue portion of the electromagnetic radiation spectrum. The scene may be formed in a physical medium such as a negative or positive color film record, a black and white film record, a photograph formed on photographic paper, a printed document, or the like. In step 520, the physical medium is scanned by illuminating the medium with visible light. Either reflected light, transmitted light, or a combination of reflected and transmitted light strike a photosensitive detector after interacting with an image formed on the physical medium, and the photosensitive detector generates electrical signals in response to the light. These electronic signals can then transmitted from the detector to a processor for image processing. Alternatively, the detector may include the necessary processing capabilities to perform image processing functions, in which case the electrical signals need not be transmitted for processing. Image processing includes alterations to the recorded electronic representation of the image, including format changes, filtering, defect removal, transformation, color correction, image combination, filter application, and the like.

After the image is captured using visible light in step 520, the method proceeds to step 532. In step 532 another lens is interposed into the optical path in preparation for an IR image capturing process. In lens focusing systems employing a fixed lens, step 532 interposes an additional "corrective" lens that works in conjunction with the fixed lens to focus IR light. In other embodiments, step 532 interposes a different lens than that interposed in step 512, which is not necessarily an additional lens. Once the lens is interposed in step 532, step 540 is performed, which uses IR light to record one or more representations of the same image for which images were captured in step 520.

The method proceeds next to step 550. In step 550, the visible light and IR images are combined. In one embodiment, the IR image is a defect map, and the visible light image is a desired image to be later reproduced. The defect map and the desired image can be electronically combined to produce an improved image having fewer and/or less noticeable defects. The images may be combined using various thresholding, summation, and difference techniques known to those skilled in the art.

The methods above describe an embodiment in which a visible light image is captured first, and then an IR image. Other embodiments capture an IR image first, and then capture a visible light image. Yet other embodiments use multiple IR and/or visible light scans, each of which may or may not be used in conjunction with different lens focusing distances, magnifications, etc.

In the preceding detailed description, reference has been made to the accompanying drawings which form a part hereof, and in which are shown by way of illustration specific embodiments in which the invention may be practiced. These embodiments have been described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description omits certain information known to those skilled in the art. The preceding detailed description is, therefore, not to be taken in a limiting sense, and the scope of the present invention is defined only by the appended claims.

What is claimed is:

1. A method of focusing separate wavelengths of light from a scene, the method comprising:

focusing a first set of wavelengths of light onto a detector, wherein focusing the first set of wavelengths comprises positioning at least one lens a first distance from at least one detector; and focusing a second set of wavelengths of light onto the at least one detector, the second set of wavelengths being different from the first set of wavelengths, and wherein focusing the second set of wavelengths comprises positioning the at least one lens a second distance from the at least one detector.

2. The method as in claim 1, wherein the second set of wavelengths of light comprises predominantly infrared light.

3. The method as in claim 1, wherein the at least one lens is positioned using a stepper motor, and wherein the second distance is a predetermined number of steps from the first distance.

4. The method as in claim 1, wherein:

the first distance from the at least one detector is determined using an automatic focusing system capable of focusing a set of wavelengths comprising visible light; and wherein the second distance from the at least one detector is a predetermined offset from the first distance.

5. The method as in claim 1, wherein the method is implemented in a scanner.

6. A lens focusing system comprising at least one lens capable of focusing at least two different sets of wavelengths of light from a scene onto a detector by altering the distance from said at least one lens to said detector.

7. The lens focusing system as in claim 6, wherein:

one of said at least two different sets of wavelengths of light comprises primarily visible light; and wherein another of said at least two different sets of wavelengths of light comprises primarily infrared light.

8. The lens focusing system as in claim 7, further comprising a motor capable of altering said distance from said at least one lens to said detector.

9. The lens focusing system as in claim 8, wherein said motor is capable of moving said at least one lens to alter said distance from said at least one lens to said detector.

10. The lens focusing system as in claim 8, wherein said motor is capable of moving said detector to alter said distance from said at least one lens to said detector.

11. The lens focusing system as in claim 8, wherein said motor is a stepper motor capable of being stepped a predetermined number of times to alter said distance from said at least one lens to said detector.

12. The lens focusing system as in claim 6, wherein:
a first distance from said at least one lens to said detector is determined using an automatic focusing system, said first distance capable of focusing a first set of wavelengths of light; and wherein
a second distance from said at least one lens to said detector is a predetermined offset from said first distance determined using said automatic focusing system.

13. The lens focusing system as in claim 6, wherein said lens focusing system is implemented in a scanner.

14. An image capturing system comprising:
at least one illumination source capable of providing illumination in the infrared portion of the electromagnetic radiation spectrum;
at least one illumination source capable of providing illumination in the visible portion of the electromagnetic radiation spectrum;
a detector capable of generating electrical signals in response to light; and
a lens focusing system comprising at least one lens capable of focusing at least two different sets of wavelengths of light from a scene onto said detector by altering the distance from said at least one lens to said detector.

15. The image capturing system as in claim 14, wherein:
one of said at least two different sets of wavelengths of light comprises primarily visible light; and wherein
another of said at least two different sets of wavelengths of light comprises primarily infrared light.

16. The image capturing system as in claim 14, further comprising a motor capable of altering said distance from said at least one lens to said detector.

17. The image capturing system as in claim 16, wherein said motor is capable of moving said at least one lens to alter said distance from said at least one lens to said detector.

18. The image capturing system as in claim 16, wherein said motor is capable of moving said detector to alter said distance from said at least one lens to said at least one detector.

19. The image capturing system as in claim 16, wherein said motor is a stepper motor capable of being stepped a predetermined number of times to alter said distance from said at least one lens to said detector.

20. The image capturing system as in claim 14, wherein:
a first distance from said at least one lens to said detector is determined using an automatic focusing system, said first distance capable of focusing a first set of wavelengths of light; and wherein
a second distance from said at least one lens to said detector is a predetermined offset from said first distance determined using said automatic focusing system.

21. The image capturing system as in claim 14, wherein said image capturing system is a scanner.

22. A method of focusing separate wavelengths of light from a scene, the method comprising:
focusing a first set of wavelengths of light onto a detector, the first set of wavelengths of light comprising predominantly visible light;
focusing a second set of wavelengths of light onto the detector, the second set of wavelengths of light comprising predominantly infrared light;
wherein the step of focusing the first set of wavelengths of light comprises interposing a first lens combination in an optical path between the physical medium and the detector; and
wherein the step of focusing the second set of wavelengths of light comprises interposing a second lens combination in the optical path between the physical medium and the detector, the second lens combination being different from the first lens combination.

23. The method as in claim 22, wherein interposing a first lens combination comprises maintaining a stationary lens in the optical path of light traveling from a scene to the detector.

24. The method as in claim 23, wherein interposing a second lens combination comprises positioning at least one movable lens, in addition to the stationary lens, in the optical path of light traveling from a scene to the detector.

25. The method as in claim 23, wherein interposing a first lens combination further comprises positioning at least a first movable lens, in addition to the stationary lens, in the optical path of light traveling from a scene to the detector.

26. The method as in claim 25, wherein interposing a second lens combination comprises removing the at least a first movable lens from the optical path of light traveling from a scene to the detector, and positioning at least a second movable lens into the optical path of light traveling from a scene to the detector.

27. The method as in claim 22, wherein interposing a first lens combination comprises positioning at least a first movable lens in the optical path of light traveling from a scene to the detector.

28. The method as in claim 27, wherein interposing a second lens combination comprises removing the at least a first movable lens from the optical path of light traveling from a scene to the detector, and positioning at least a second movable lens into the optical path of light traveling from a scene to the detector.

29. The method as in claim 22, wherein interposing a second lens combination comprises maintaining a stationary lens in the optical path of light traveling from a scene to the detector.

30. The method as in claim 29, wherein interposing a first lens combination comprises positioning at least one movable lens, in addition to the stationary lens, in the optical path of light traveling from a scene to the detector.

31. The method as in claim 29, wherein interposing a second lens combination further comprises positioning at least a first movable lens, in addition to the stationary lens, in the optical path of light traveling from a scene to the detector.

32. The method as in claim 31, wherein interposing a first lens combination comprises removing the at least a first movable lens from the optical path of light traveling from a scene to the detector, and positioning at least a second movable lens into the optical path of light traveling from a scene to the detector.

33. The method as in claim 22, wherein interposing a second lens combination comprises positioning at least a first movable lens in the optical path of light traveling from a scene to the detector.

34. The method as in claim 33, wherein interposing a first lens combination comprises removing the at least a first movable lens from the optical path of light traveling from a scene to the detector, and positioning at least a second movable lens into the optical path of light traveling from a scene to the detector.

35. The method as in claim 22, wherein the method is implemented in a scanner.

* * * * *